US006989096B2

(12) United States Patent
Roberts et al.

(10) Patent No.: US 6,989,096 B2
(45) Date of Patent: Jan. 24, 2006

(54) APPARATUS FOR DIRECTING FLUIDS THROUGH A FILTER SYSTEM

(75) Inventors: R. Lee Roberts, Chadds Ford, PA (US); Mark Kevin Addison, Bear, DE (US)

(73) Assignee: RG Delaware, Inc., Wilmington, DE (US)

( * ) Notice: Subject to any disclaimer, the term of this patent is extended or adjusted under 35 U.S.C. 154(b) by 222 days.

(21) Appl. No.: 10/438,991

(22) Filed: May 16, 2003

(65) Prior Publication Data

US 2003/0201219 A1 Oct. 30, 2003

Related U.S. Application Data

(63) Continuation of application No. 09/766,631, filed on Jan. 23, 2001, now Pat. No. 6,569,327.

(51) Int. Cl.
*B01D 24/22* (2006.01)
*B01D 24/26* (2006.01)

(52) U.S. Cl. ....................... 210/220; 210/232; 210/274; 210/275; 210/293

(58) Field of Classification Search ................. 210/220, 210/232, 233, 248, 274, 275, 293
See application file for complete search history.

(56) References Cited

U.S. PATENT DOCUMENTS 3,110,667 A 11/1963 Stuppy
3,685,657 A 8/1972 Hunter
3,956,134 A 5/1976 Sturgill
4,118,322 A 10/1978 San Roman
4,579,659 A 4/1986 Eads et al.
4,619,765 A 10/1986 Roberts
4,707,257 A 11/1987 Davis
4,817,561 A 4/1989 Byrne et al.
4,882,053 A * 11/1989 Ferri .......................... 210/293
5,068,034 A 11/1991 Walter
5,087,362 A 2/1992 Brown
5,108,627 A 4/1992 Berkebile
5,149,427 A 9/1992 Brown
5,160,614 A 11/1992 Brown (Continued)

FOREIGN PATENT DOCUMENTS

WO WO 97/00110 1/1997

OTHER PUBLICATIONS

Brochure on "INFINITY continuous lateral underdrain" copyrighted 1999.
"Leopold Universal Type S Underdrain. The Proven Stanard of Excellence Made Better!" copyrighted 1994.
"Roberts' Ceramic Underdrain Block", 4pp.

*Primary Examiner*—Robert James Popovics
(74) *Attorney, Agent, or Firm*—Merek, Blackmon & Voorhees, LLC

(57) ABSTRACT

A fluid distribution system for directing fluids through a filter system. The fluid distribution system ensures proper distribution of fluids during the process of filtering as well as the process of washing a filter bed. The fluid distribution system may be used with numerous filter systems including but not limited to an upflow filter, a downflow filter, a combined upflow/downflow filter and/or multiple downflow filters connected in series.

15 Claims, 16 Drawing Sheets

U.S. PATENT DOCUMENTS

| | | | | |
|---|---|---|---|---|
| 5,232,592 A | | 8/1993 | Brown | |
| 5,269,920 A | | 12/1993 | Brown | |
| 5,328,608 A | | 7/1994 | Bergmann | |
| 5,462,664 A | | 10/1995 | Neuspiel | |
| 5,489,388 A | | 2/1996 | Brown | |
| 5,534,202 A | | 7/1996 | Roberts | |
| 5,618,426 A | | 4/1997 | Eischen | |
| 5,639,384 A | | 6/1997 | Brown | |
| 5,865,774 A | | 2/1999 | Brenman | |
| 5,865,999 A | | 2/1999 | Shea | |
| 6,048,132 A | | 4/2000 | Kupke | |
| 6,090,284 A | | 7/2000 | Melber | |
| 6,143,188 A | | 11/2000 | Jantsch | |
| 6,190,568 B1 | | 2/2001 | Hunkele | |
| 6,325,931 B1 | | 12/2001 | Roberts | |
| 6,569,327 B2 | * | 5/2003 | Roberts et al. | 210/274 |
| 6,740,237 B1 | * | 5/2004 | Roberts et al. | 210/275 |
| 2002/0096463 A1 | * | 7/2002 | Roberts et al. | 210/209 |
| 2003/0201219 A1 | * | 10/2003 | Roberts et al. | 210/274 |

* cited by examiner

APPARATUS FOR DIRECTING FLUIDS THROUGH A FILTER SYSTEM

The subject patent application is a continuation under 35 USC 120 of U.S. patent application Ser. No. 09/766,631 filed on Jan. 23, 2001 now U.S. Pat. No. 6,569,327.

FIELD OF THE INVENTION

The present invention includes one or more devices for directing fluids (i.e., a liquid and/or a gas) through a filter system for filtering water and/or wastewater. The filter system includes but is not limited to an upflow filter, a downflow filter, a filter system having a combined upflow filter and a downflow filter and/or a filter system having multiple (i.e., more than one) downflow filters connected in series.

BACKGROUND OF THE INVENTION

Various systems have been developed to filter water and wastewater. Typical filter systems include but are not limited to an upflow filter, a downflow filter, a combined upflow filter and a downflow filter and multiple downflow filters connected in series. The term upflow filter is given to a filter in which the liquid or influent to be filtered is directed in an upward path to remove impurities. Conversely, a downflow filter is a filter in which the influent is directed in a downward path to remove impurities. In a combined upflow/downflow filter, influent is directed upwardly through the upflow filter to remove a predetermined percentage of the impurities in the influent and then the influent is directed downwardly through the downflow filter to remove the remaining impurities to within an acceptable limit. In this type of system, it is common for the upflow filter and downflow filter to include one or more layers of filter media supported by one or more gravel support layers. Gravel support layers are necessary for certain filter systems to prevent clogging of the underdrain. For example, one common type of underdrain includes a plurality of underdrain blocks arranged in parallel rows across the bottom of the filter. The underdrain blocks act to direct and receive fluids including influent, effluent and air during operation of the filter system. The underdrain blocks typically include multiple large apertures through which the fluids are directed and received. The apertures are of such a size that the filter media can pass therethrough and clog the underdrain block. This of course is disadvantageous. One solution has been the use of one or more gravel support layers to support the filter media. The gravel is larger than the openings in the underdrain block and, therefore, does not pass therethrough.

However, gravel support layers have a number of disadvantages. Specifically, gravel support layers ate expensive and time consuming to install. Further, gravel support layers consume a significant portion of the filter chamber thus reducing the filtering capacity of the bed. Also, gravel support layers are subject to being upset when uncontrolled air enters the filter bed due to improper installation of the air system or operator error. Moreover, in filter beds using granular activated carbon such must occasionally be removed from the filter and placed in a reactivation furnace. During removal of the granular activated carbon, the gravel becomes intermixed and is deposited in the reactivation furnace. At the extreme temperatures necessary to reactivate the granular activated carbon the gravel can explode damaging the furnace.

To overcome the disadvantages of gravel support layers, porous plates have been used with underdrain blocks. The porous plates obviate the need for the gravel support layers because they prevent the filter media from passing through the apertures in the underdrain block. Typically, porous plates have been fastened directly to the underdrain block with screws or bolts. This conventional means of securing the porous plate to the underdrain block has significant drawbacks. These conventional fasteners increase the cost of the system from both a materials and labor stand point. Further, if the porous plate needs to be replaced a laborer would be required to removal all of the numerous fasteners before such could be accomplished. Moreover, conventional fasteners could damage the porous plate requiring its removal. In addition, a direct connection of the porous plate to the underdrain block without sufficient offset would likely lead to maldistribution of the fluid.

To overcome the disadvantages of prior underdrain systems including but not limited to the disadvantages attendant securing a porous plate to an underdrain block with conventional fasteners Roberts Water Technologies introduced the novel and unobvious INFINITY™ continuous lateral underdrain. This underdrain is prior art to the subject patent application as it was sold or offered for sale more than a year prior to the filing date of the subject patent application. This underdrain is advertised on the World Wide Web at www.robertsfiltergroup.com. While the INFINITY™ underdrain is a significant improvement over previously developed underdrains, the present invention is yet a further substantial improvement over the INFINITY™ underdrain. Specifically, one aspect of the present invention includes a novel and unobvious means for permitting a porous plate to be readily removed from a supporting structure allowing replacement thereof. A significant advantage to this aspect of the invention is that the porous plate can be removed from the supporting structure readily without damaging the major components of the underdrain.

Another significant disadvantage of prior developments is that an existing underdrain could not be satisfactorily retrofitted with a porous plate thereby obviating the need for one or more gravel support layers. Further, prior developments lacked the ability to readily retrofit numerous different types of underdrains with a porous plate to thereby obviate the need for one or more gravel support layers.

Prior fluid distribution systems included means for distributing air to a filter bed having one or more layers of media during washing of the filter bed. This is commonly referred to as air scouring. Air scouring has been determined to be an important process in cleaning filter beds. A number of existing underdrain systems are designed such that liquids and gases flow through common conduits. Such underdrain systems have significant drawbacks. Specifically, because of the conflict between the flow rates of liquids and gases, upper limits must unnecessarily be imposed minimizing the flexibility in setting different ranges of flow rates for liquids and gases. Further, common discharge passages for liquids and gases result in uneven discharge of the air bubbles resulting in undesirable maldistribution. To overcome the disadvantages of prior underdrain systems including but not limited to the disadvantages attendant common liquid and gas conduits, Roberts Water Technologies introduced the novel and unobvious ARIES® managed air systems. This managed air system is advertised on the World Wide Web at www.robertsfiltergroup.com. and disclosed in U.S. Pat. Nos. 5,535,202 and 5,673,481. While the ARIES® managed air system is a significant improvement over previously developed air scour systems, the present invention is yet a further substantial improvement as will be readily recognized by those skilled in the art.

Some previously known air scour systems have also suffered from the disadvantage of maldistribution owing to incomplete evacuation of water from the air conduit. The problem of incomplete evacuation of water is often experienced where the air conduit has not been installed correctly. One example, is an unlevel installation of the air conduit. In such circumstances, the exit or discharge openings on the low side of the air conduit often remain blocked by water preventing proper distribution of air to the filter bed to adequately clean the same.

Previously known combined air and liquid distribution systems utilizing shared conduits have experienced uncontrolled releases of air which can lead to significant problems. Specifically, systems using shared conduits are likely to experience rapid introduction of air or water flow. This rapid introduction of flow can create a wave action resulting in fluctuation of the interfaces which can expose the water metering orifices to air flow resulting in gross maldistribution.

OBJECTS AND SUMMARY OF THE INVENTION

An object of the present invention is to provide a novel and unobvious fluid distribution system.

Another object of a preferred embodiment of the present invention is to provide a fluid distribution system which obviates the need for one or more gravel support layers.

A further object of a preferred embodiment of the present invention is to provide a fluid distribution system which retains a porous plate without the use of conventional fasteners such as screws and bolts.

Still a further object of a preferred embodiment of the present invention is to provide a fluid distribution system which permits ready removal of a porous plate for replacement without damaging the major components of the fluid distribution system.

Yet still a further object of a preferred embodiment of the present invention is to provide a fluid distribution system which does not suffer from maldistribution of liquids and/or gases.

Another object of a preferred embodiment of the present invention is to provide a fluid distribution system which permits upgrading an existing underdrain system to allow removal of one or more gravel support layers without removing the existing underdrain structure.

A further object of a preferred embodiment of the present invention is to provide a fluid distribution system which can be readily used in conjunction with numerous different exiting underdrains to permit removal of one or more gravel support layers.

Still another object of a preferred embodiment of the present invention is to provide a fluid distribution system which provides for separate liquid and gas distribution conduits.

Still a further object of a preferred embodiment of the present invention is to provide a fluid distribution system that permits an air conduit to be readily attached to an underdrain.

Yet another object of the present invention is to provide a fluid distribution system which includes an air conduit having means for facilitating evacuation of water from the air conduit.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is an apparatus for use in a filter system for filtering water or wastewater. The apparatus includes an underdrain. The underdrain has at least one chamber. The apparatus further includes a porous plate and at least one support member for supporting the porous plate in fixed relationship relative to the at least one chamber. The support member includes a weakness point or other means for permitting ready removal of the porous plate. Another embodiment of the present invention is a method of enhancing an existing underdrain of a filter system for filtering water or wastewater. The method includes the steps of providing an existing underdrain; providing an underdrain cap having a support member for supporting or receiving a porous plate; securing the underdrain cap to the existing underdrain; and, providing at least one porous plate to obviate the need for one or more media support layers.

A further embodiment of the present invention is an apparatus for use in a filter system for filtering water or wastewater. The apparatus includes an underdrain; an underdrain cap secured to the underdrain; and, an air distribution conduit detachably connected to the underdrain cap. Still another embodiment of the present invention is an apparatus for use in filter systems for filtering water or wastewater. The apparatus includes at least one underdrain block and an air conduit detachably connected to the underdrain block. Still another embodiment of the present invention is an apparatus for use in a filter system for filtering water or wastewater. The apparatus includes an underdrain and an underdrain cap secured to the underdrain. The underdrain cap includes a recess or other means for receiving a porous plate.

Still a further embodiment of the present invention is an apparatus for use in a filter system for filtering water or wastewater. The apparatus includes at least one liquid distribution chamber and at least one air distribution conduit. The apparatus further includes a porous plate. The at least one air distribution conduit includes an exit opening disposed such that air exits the air conduit below the porous plate.

Yet another embodiment of the present invention is an apparatus for use in a filter system for filtering water or wastewater. The apparatus includes at least one liquid distribution chamber and at least one distribution conduit. The air distribution conduit includes an internal flange or other means for facilitating evacuation of water from the air distribution conduit. Yet a further embodiment of the present invention is an apparatus for use in a filter system for filtering water or wastewater. The apparatus includes at least one liquid distribution chamber and at least one air distribution conduit. The apparatus further includes a porous plate. The liquid distribution chamber is disposed entirely below the porous plate. The at least one air distribution conduit includes upper and lower portions. The upper portion is located above the porous plate while the lower portion is located below the porous plate.

DETAILED DESCRIPTION OF THE PREFERRED EMBODIMENTS OF THE INVENTION

The preferred forms of the invention will now be described with reference to FIGS. 1–21. The appended claims are not limited to the preferred embodiments and no term used herein is to be given a meaning other than its ordinary meaning unless accompanied by a statement that the term "as used herein is defined as follows".

FIGS. 1 Through 4

Referring to FIGS. 1 through 4, a fluid distribution system A is depicted. The fluid distribution system includes an existing underdrain B, a pair of underdrain caps C and D and a pair of air conduits E and F. An air supply connection G is secured to the air distribution conduit E in a fluid tight manner. An air supply connection H is secured to the air distribution conduit F in a fluid tight manner.

Figure 1:
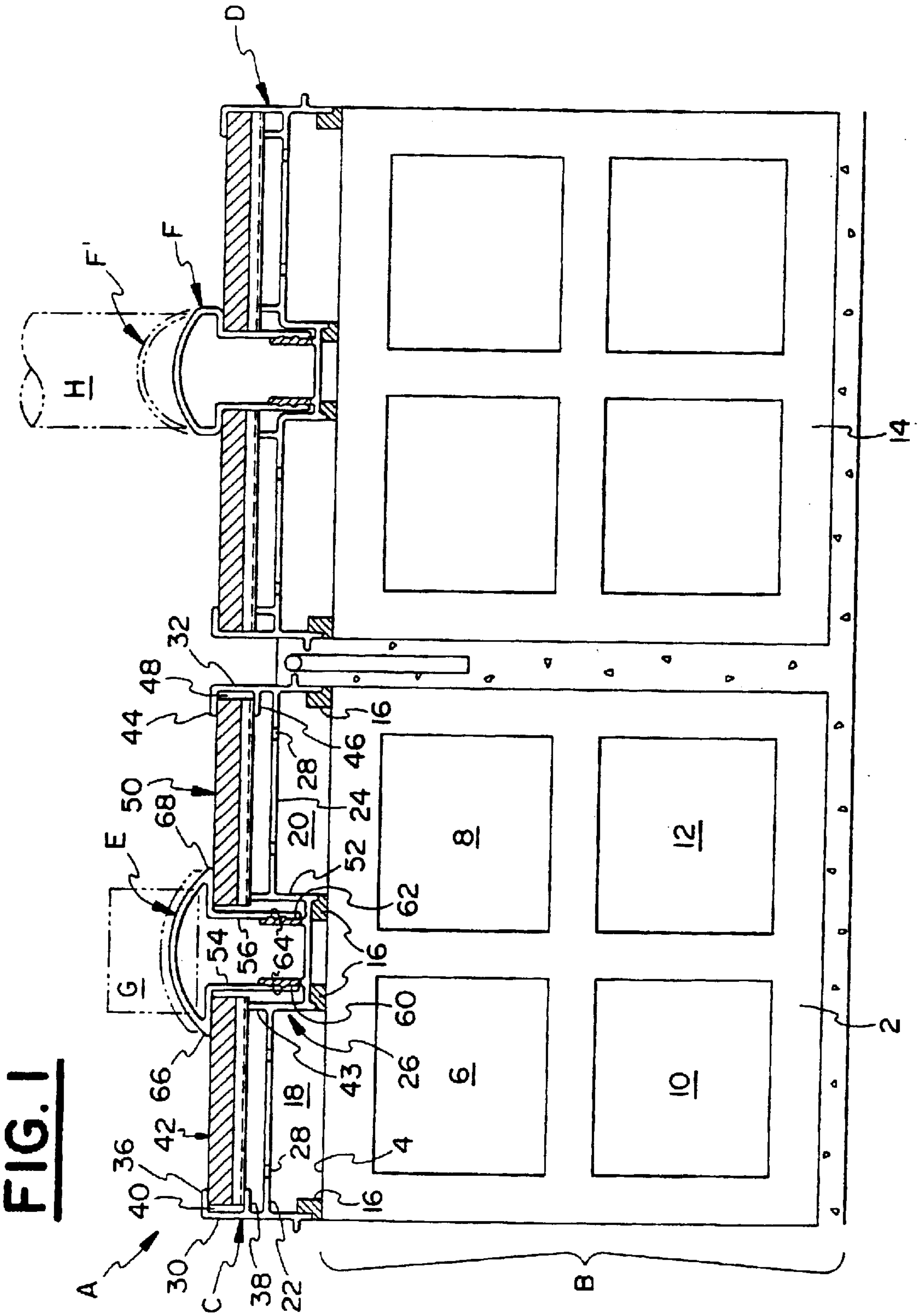
FIG. 1 is a cross-sectional view of a first preferred embodiment of the present invention depicting two of multiple possible variations thereof.

The existing underdrain includes a plurality of rows of underdrain blocks which are positioned on or adjacent the bottom of the filter. Only two rows are depicted in FIG. 1. The first row 2 of clay tile underdrain blocks are disposed beneath the underdrain cap C. The rows are formed by multiple underdrain blocks positioned in end to end relationship. As is conventional, the upper surface 4 of each of the clay tile underdrain blocks includes a plurality of openings (not shown) through which fluid can pass. Each underdrain block in the first row 2 includes four (4) chambers or conduits 6, 8, 10 and 12. Openings (not shown) are provided in the underdrain blocks so that chamber 10 communicates with chamber 6 and chamber 12 communicates with chamber 8. The second row 14 of clay tile underdrain blocks are configured in a manner similar to the underdrain blocks in the first row 2 and, therefore, these underdrain blocks will not be described in detail.

The underdrain cap C is secured and sealed to the clay tile underdrain blocks via grout 16. However, it will be readily appreciated that any suitable material may be used to secure and seal the underdrain cap C to the underdrain blocks including but not limited to elastomeric sealants. Preferably, the underdrain cap C is extruded in continuous lengths from high impact corrosion resistant PVC. Hence, the underdrain cap C preferably runs substantially the length of the row of underdrain blocks. However, it will be readily appreciated that the underdrain cap C could be formed from any suitable material. Further, the underdrain cap C may be sized such that multiple segments are positioned end to end to extend the substantially the length of the row of underdrain blocks. While the underdrain cap C is shown as running along (i.e., parallel to) the underdrain blocks, it will be readily appreciated that such could be oriented perpendicular to the underdrain blocks.

Figure 4:
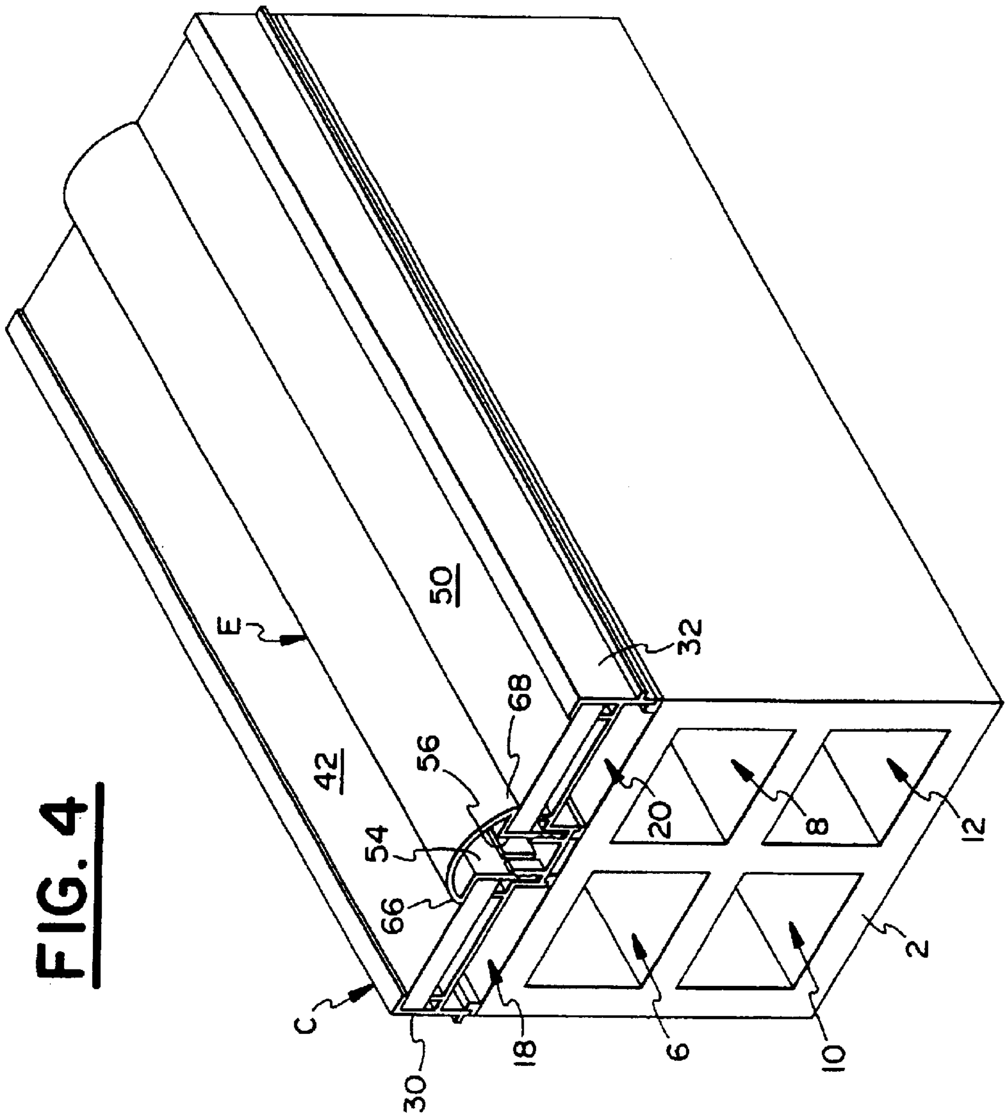
FIG. 4 is a perspective view of the variation of the first preferred embodiment depicted on the left side of FIG. 1.

Referring to FIGS. 1 and 4, the underdrain cap C forms two conduits or chambers 18 and 20. Chamber 18 communicates with chamber 6 via the opening in the upper surface 4 of the underdrain blocks. Similarly, the chamber 20 communicates with the chamber 8 via the openings in the upper surface 4 of the underdrain blocks. While two chambers are shown as being formed by the underdrain cap C, it will be readily appreciated that the underdrain cap C may be configured such that one or more than two chambers are formed. The underdrain cap C preferably includes a pair of horizontal walls 22 and 24 extending outwardly from recessed portion 26. Walls 22 and 24 are provided with the appropriate number of discharge openings or orifices 28 to assure that the liquid flowing from the clay tile underdlain blocks is properly distributed throughout the filter bed. When this embodiment of the present invention is used in an upflow filter, chambers 18 and 20 assure that the influent to be filtered will be uniformly discharged into the filter bed in the case of an upflow filter. Further, when used in an upflow filter these chambers assure that the backwash liquid which may be either influent or filtered water will be uniformly discharged into the filter bed. Similarly, when the present invention is used in a downflow filter, chambers 18 and 20 assure that the filtered water will be uniformly collected and that the backwash liquid will be uniformly discharged into the filter bed. This is a significant improvement of prior devices which mounted a porous plate directly to an underdrain block without any type of underdrain cap therebetween.

The underdrain cap C further includes a pair of vertically oriented support members 30 and 32. Support member 30 includes a pair of horizontally extending elements 36 and 38. Elements 36 and 38 form a recess 40 for receiving a portion of porous plate 42. Vertically oriented wall 43 supports the opposite end of porous plate 42. Similarly, support member 32 includes a pair of horizontally extending elements 44 and 46. Elements 44 and 46 form a recess 48 for receiving a portion of porous plate 50. Vertically oriented wall 52 supports the opposite end of porous plate 50.

The air conduit E is snap fit onto the underdrain cap C. Specifically, the air conduit E has a pair of vertically extending walls 54 and 56. Each of the walls 54 and 56 have a pair of recesses 58. A pair of walls 60 and 62 extend upwardly from the bottom of recess 26. The walls 60 and 62 each include a pair of protrusions 64 for engaging the recesses formed in the corresponding walls of air conduit E. This configuration permits the air conduit to be readily snap fit onto the underdrain cap C. It will be readily appreciated that various other configurations could be used to snap fit the air conduit onto the underdrain. In this regard, it is noted that while walls 60 and 62 are depicted as being on the inside of the corresponding walls 54 and 56 such orientation can be reversed. Air conduit E includes a pair of shoulders 66 and 68. Shoulder 66 aids in securing porous plate 42 in fixed relationship relative to the underdrain blocks. Similarly, shoulder 68 aids in securing porous plate 50 in fixed relationship relative to the underdrain blocks. It will be readily appreciated that porous plates 42 and 50 are held in fixed relationship relative to the underdrain block without the use of screws or bolts.

Figure 3:
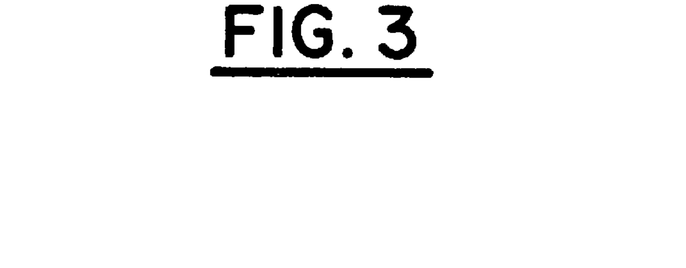
FIG. 3 is a cross-sectional view taken along lines 3—3 in FIG. 2.

Referring to FIG. 3, porous plate 50 has a plurality of grooves 70 formed therein. It should be noted that while FIG. 3 depicts porous plate 50, porous plate 42 is configured in an identical manner. A channel 72 is disposed in each of the grooves 70. The channels 72 ensure proper distribution of air or other gas along the width of the porous plates 42 and 50. It will be noted that the ends of the porous plates 42 and 50 adjacent the air conduit E are spaced from walls 54 and 56. This spacing permits air or other gas to enter the channels 72.

The preferred embodiment depicted in FIGS. 1 through 4 prevents the mixing of gas or liquids in chambers 18 and 20.

Rebar hook anchor 74 is disposed in the grout between the underdrain blocks to enhance securement of the underdrain caps C and D.

Figure 2:
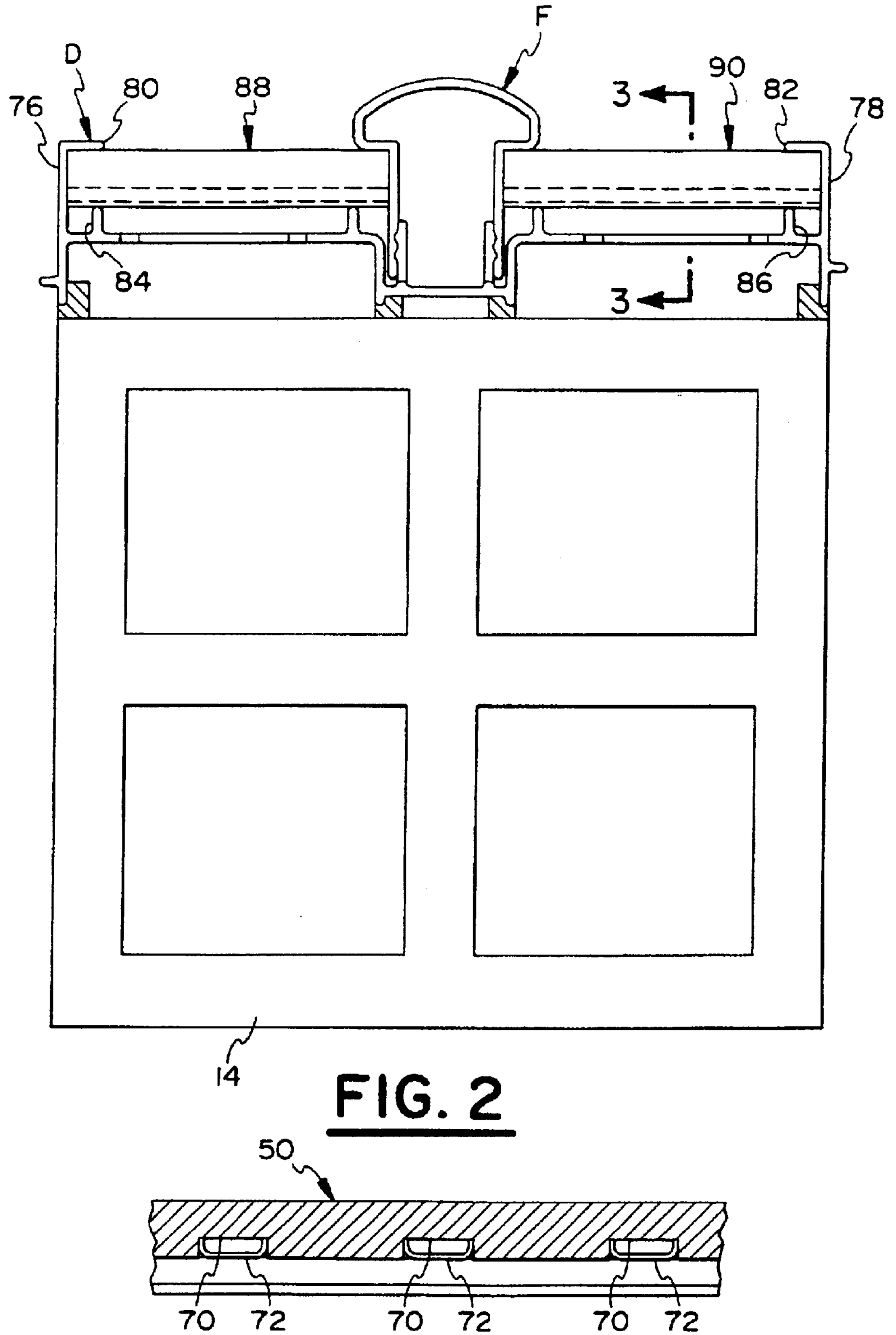
FIG. 2 is a cross-sectional view of one of the two possible variations depicted in FIG. 1.

Referring to FIG. 2, underdrain cap D depicts one of many possible variations to the underdrain cap C. Underdrain cap D is similar to underdrain cap C, therefore, only the differences will be explained in detail. Vertically oriented walls 76 and 78 have horizontally extending elements 80 and 82, respectively. Further, vertically extending elements 84 and 86 are disposed adjacent elements 80 and 82, respectively. Elements 80 and 84 form a recess to receive one end of porous plate 88. Similarly, elements 82 and 86 form a recess to receive one end of the porous plate 90. Unlike porous plates 42 and 50, porous plates 88 and 90 directly abut the air conduit F. Metering orifices are provided in the channels adjacent the air conduit F to permit air or other gas to enter the channels and subsequently pass through the corresponding porous plate to the filter bed. It will be readily appreciated that other types of openings other than metering orifices may be used. Air conduit F has a different configuration from air conduit E. As will be appreciated by one of ordinary skill in the art, the air conduits may be configured in numerous different ways. The dashed lines F illustrates one such possible modification.

FIG. 5

Figure 5:
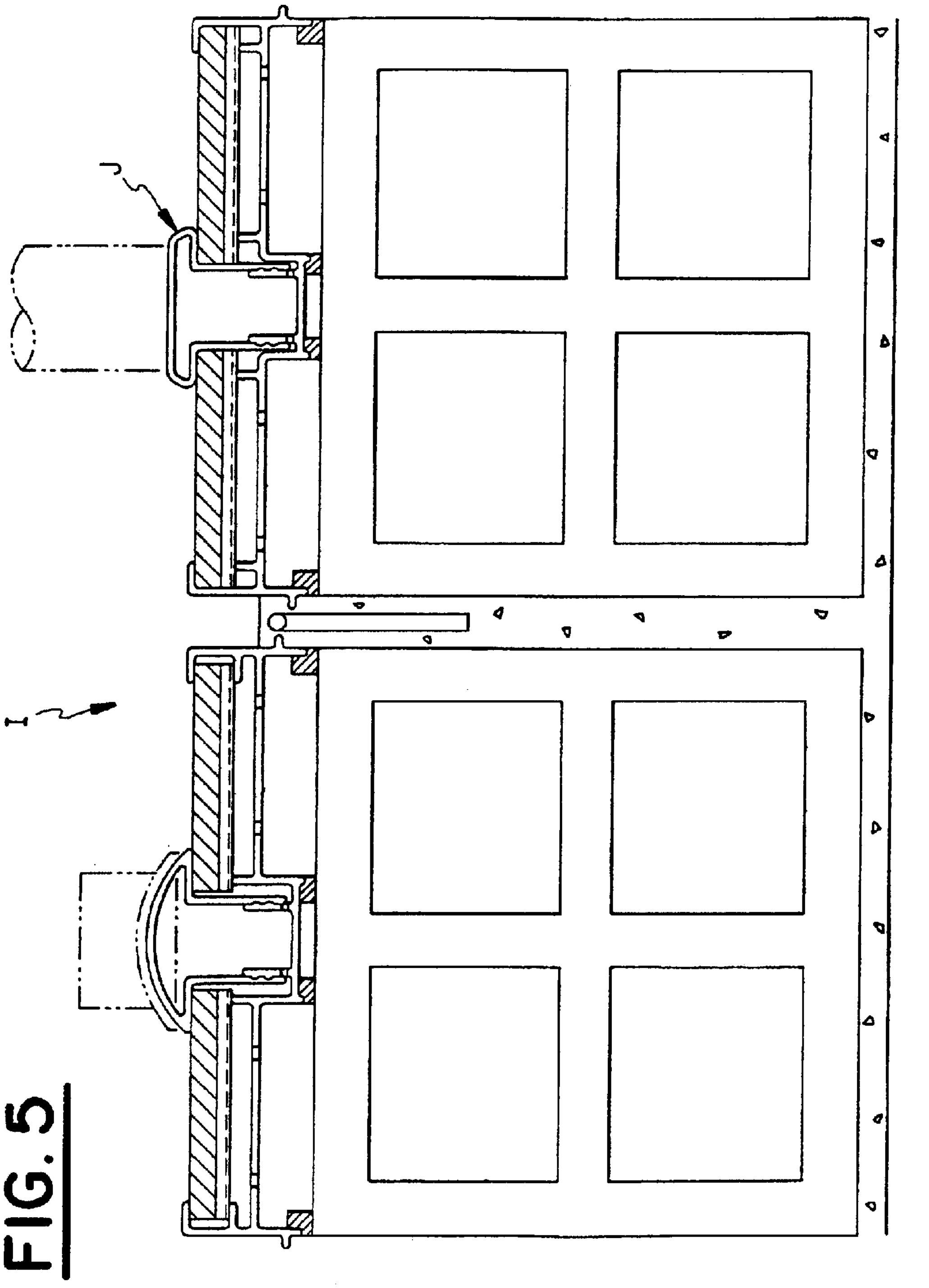
FIG. 5 is a cross-sectional view of two of multiple possible variations of the first preferred embodiment of the present invention one of which is depicted in FIG. 1 the other of which is not depicted in any of the previous drawings.

Referring to FIG. 5, a fluid distribution system I is illustrated. Fluid distribution system I is very similar to the fluid distribution system A. Accordingly, only the differences will be described. Specifically, air conduit J has a different configuration than previously illustrated air conduits.

FIGS. 6 Through 9

Figure 6:
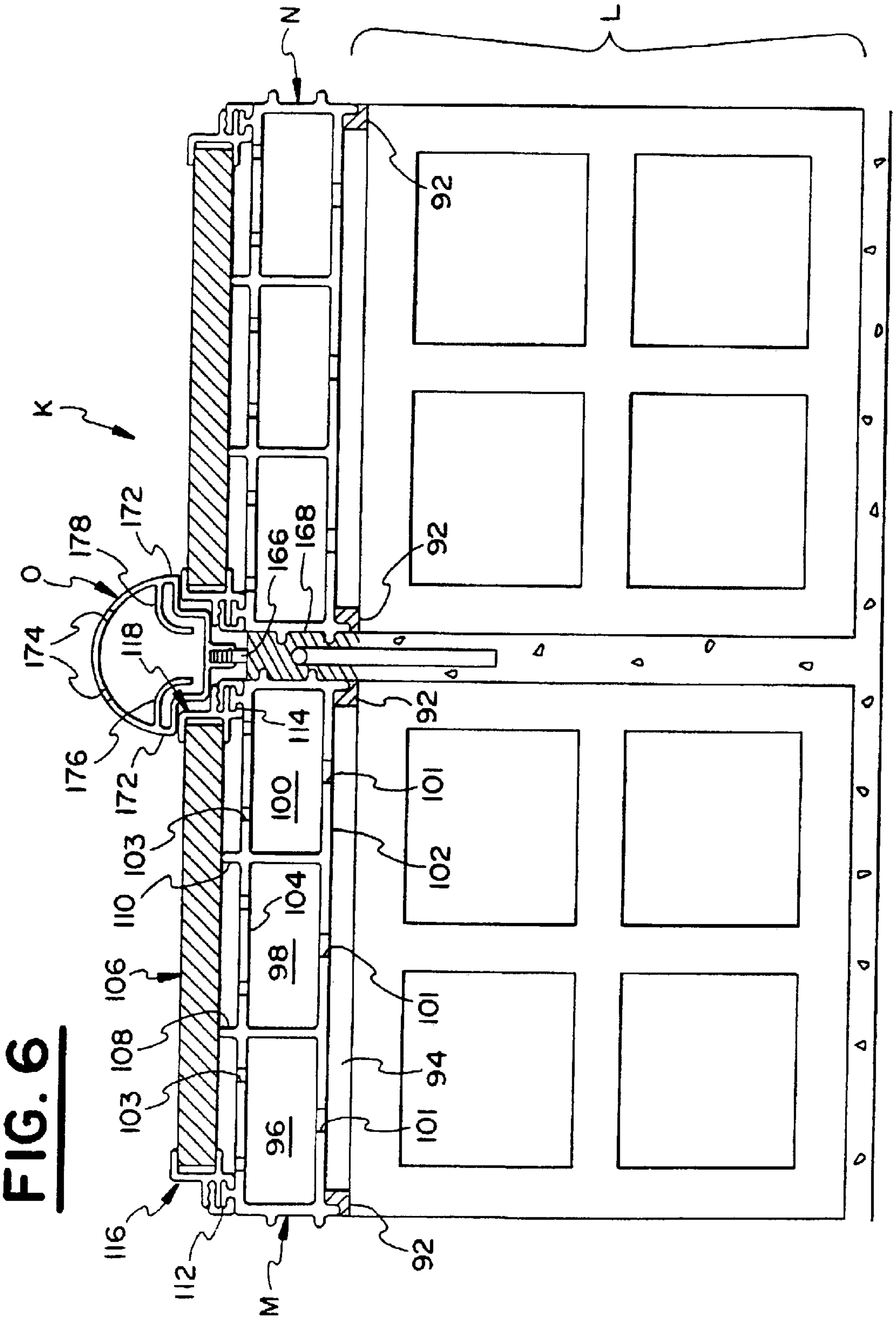
FIG. 6 is a cross-sectional view of a second preferred embodiment of the present invention.

Referring to FIG. 6, a fluid distribution system K is depicted. The fluid distribution system K includes an existing underdrain L, a pair of underdrain caps M and N and an air conduits O. An air supply connection (not shown) is secured to the air distribution conduit O in a fluid tight manner to supply air or other gas to the air distribution conduit O. The existing underdrain L is as described in connection with the fluid distribution system A.

The underdrain cap M is secured and sealed to the clay tile underdrain blocks via grout 92. However, it will be readily appreciated that any suitable material may be used to secure and seal the underdrain cap M to the underdrain blocks including but not limited to elastic sealants. Preferably, the underdrain cap M is extruded in continuous lengths from high impact corrosion resistant PVC. Hence, the underdrain cap M preferably runs substantially the length of the row of underdrain blocks. However, it will be readily appreciated that the underdrain cap M could be formed from any suitable material. Further, the underdrain cap M may be sized such that multiple segments are positioned end to end to extend substantially the length of the row of underdrain blocks.

The underdrain cap M forms four conduits or chambers 94, 96, 98 and 100. Chamber 94 communicates with the chambers in the underdrain blocks via the openings formed in the upper surface of the underdrain blocks. Chambers 96, 98 and 100 communicate with chamber 94 via a plurality of openings 101 formed in horizontally extending wall 102. The underdrain cap M includes a horizontal wall 104 which extends substantially parallel to wall 102. A plurality of openings 103 are formed in wall 104 to permit fluid to pass from chambers 96, 98 and 100 upwardly through porous plate 106. A pair of elements 108 and 110 extend upwardly from wall 104 to support the mid-section of porous plate 106. End rails 112 and 114 extend along opposite sides of the wall 104. Porous plate support members 116 and 118 are connected to end rails 112 and 114, respectively. Support members 116 and 118 are configured in a similar manner. Accordingly, only support member 116 will be described in detail.

Figure 7:
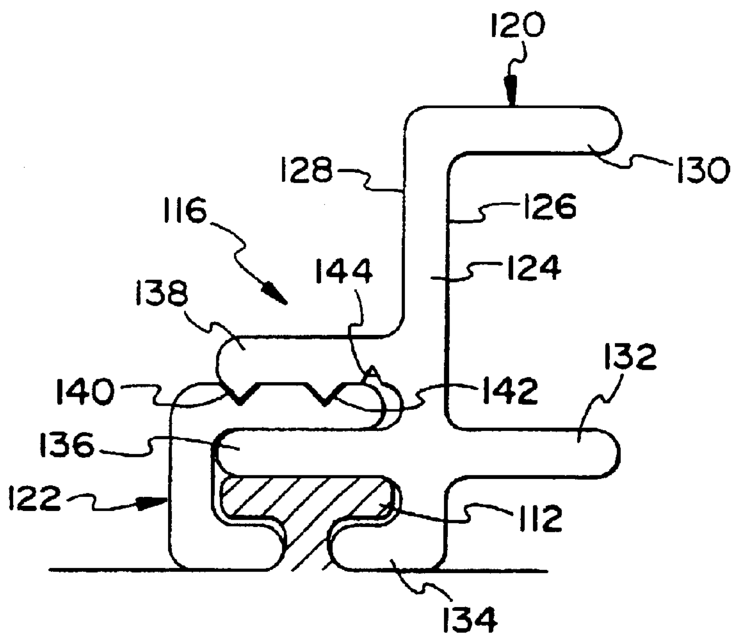
FIG. 7 is a cross-sectional view of a portion of the second preferred embodiment depicted in FIG. 6.
Figure 8:
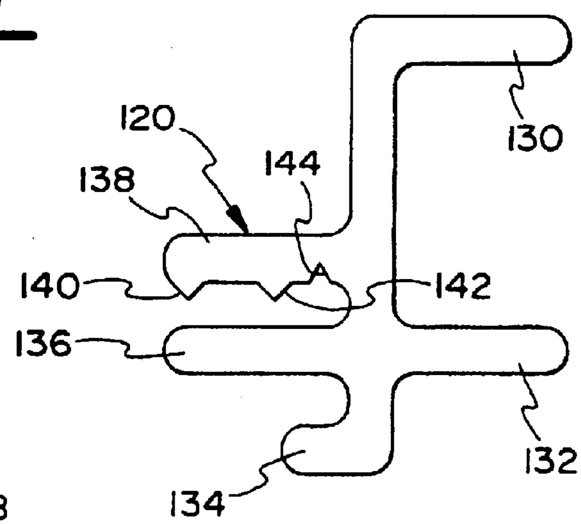
FIG. 8 is a cross-sectional view of one of the elements depicted in FIG. 7.
Figure 9:
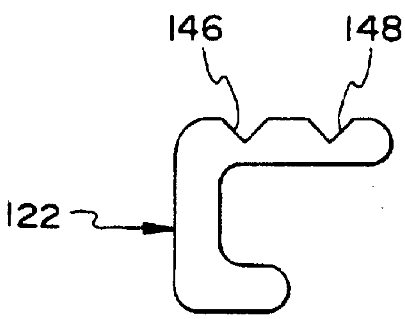
FIG. 9 is a cross-sectional view of one of the elements depicted in FIG. 7.

Referring to FIGS. 7 through 9, support member 116 includes two separate elements 120 and 122. Element 120 includes a vertical segment 124. The vertical segment 124 includes inner surface 126 and outer surface 128. A pair of members 130 and 132 extend inwardly from the inner surface 126. Members 130 and 132 form a recess for receiving a portion of porous plate 106 as is readily seen in FIG. 6. Members 134, 136 and 138 extend outwardly from the outer surface 128. Members 134 and 136 receive a portion of end rail 112. Member 138 has a pair of protrusions 140 and 142 as well as a weakness point 144. While weakness point 144 is illustrated as a V-shaped notch, it will be readily appreciated that the weakness point 144 can take many different forms. Further, it will be readily appreciated that the weakness point can be formed in a variety of different ways. Weakness point 144 allows removal of the porous plate 106 without damage to any major component of the underdrain cap M. Specifically, one need only cut member 138 along the weakness point 144 to readily detach the porous plate support member 120 from the porous plate 106. In this manner, the porous plate can be readily replaced.

Figure 10:
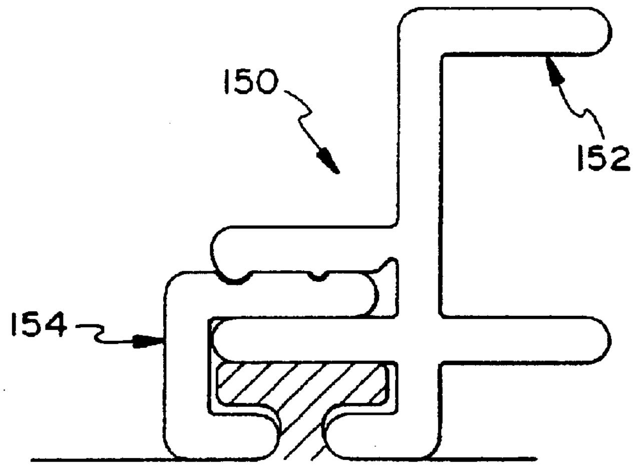
FIG. 10 is a cross-sectional view of one of multiple possible variations of the portion of the second preferred embodiment illustrated in FIG. 7.
Figure 11:
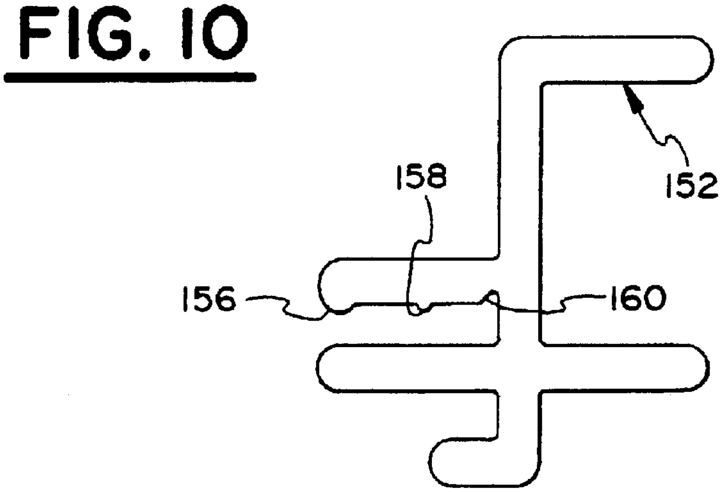
FIG. 11 is a cross-sectional view of one of the elements depicted in FIG. 10.
Figure 12:
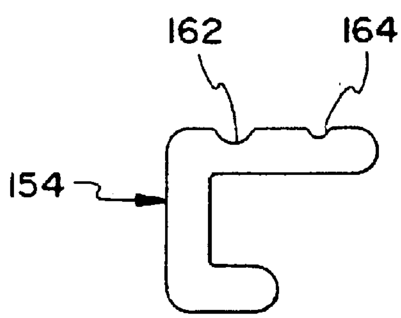
FIG. 12 is a cross-sectional view of one of the elements depicted in FIG. 10.

Element 122 is substantially L-shaped and receives a portion of the end rail 112 as seen in FIG. 7. Element 122 includes a pair of v-shaped notches 146 and 148 which receive protrusions 140 and 142, respectively. Referring to FIGS. 10 through 12, an alternative form of porous plate support member is illustrated. The porous plate support member 150 includes two separate elements 152 and 154. Element 152 differs from element 120 in that the protrusions 156 and 158 as well as the weakness point 160 are shaped differently. Element 154 differs from element 122 in that the recesses 162 and 164 are shaped differently.

Referring again to FIG. 6, the underdrain cap N is formed in a similar manner to underdrain cap M and, therefore, will not be described in detail. Air distribution conduit O is snapped onto pin 166. Pin 166 is epoxied into grout 168 or other suitable material. Rebar hook anchor 170 is provided to enhance securement of the underdrain caps M and N to the underdrain blocks.

Air distribution conduit O includes a plurality of water evacuation openings 172 and a plurality of air distribution orifices 174. Internal flanges 176 and 178 facilitate the evacuation of water from the air distribution conduit O.

Figure 13:
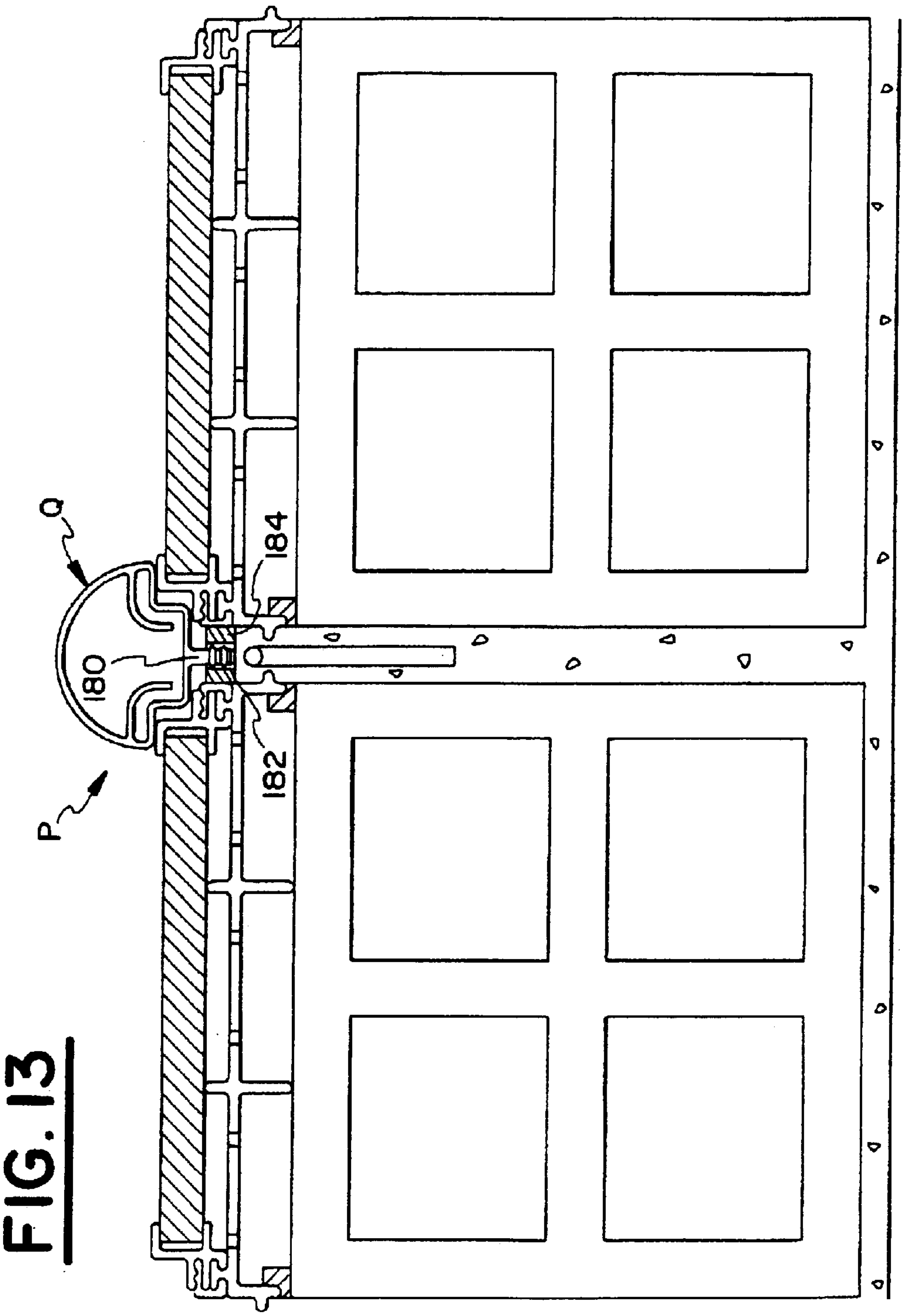
FIG. 13 is a cross-sectional view of a third preferred embodiment of the present invention.

Referring to FIG. 13, fluid distribution system P is similar to fluid distribution system K depicted in FIG. 6. Accordingly, only the differences will be explained in detail. System P includes an air conduit Q. Air conduit Q has a pin 180 formed as one piece therewith. A corresponding thin female element 182 is epoxied into the grout 184 or other suitable material. The pin 180 is snapped into female element 182.

Figure 14:
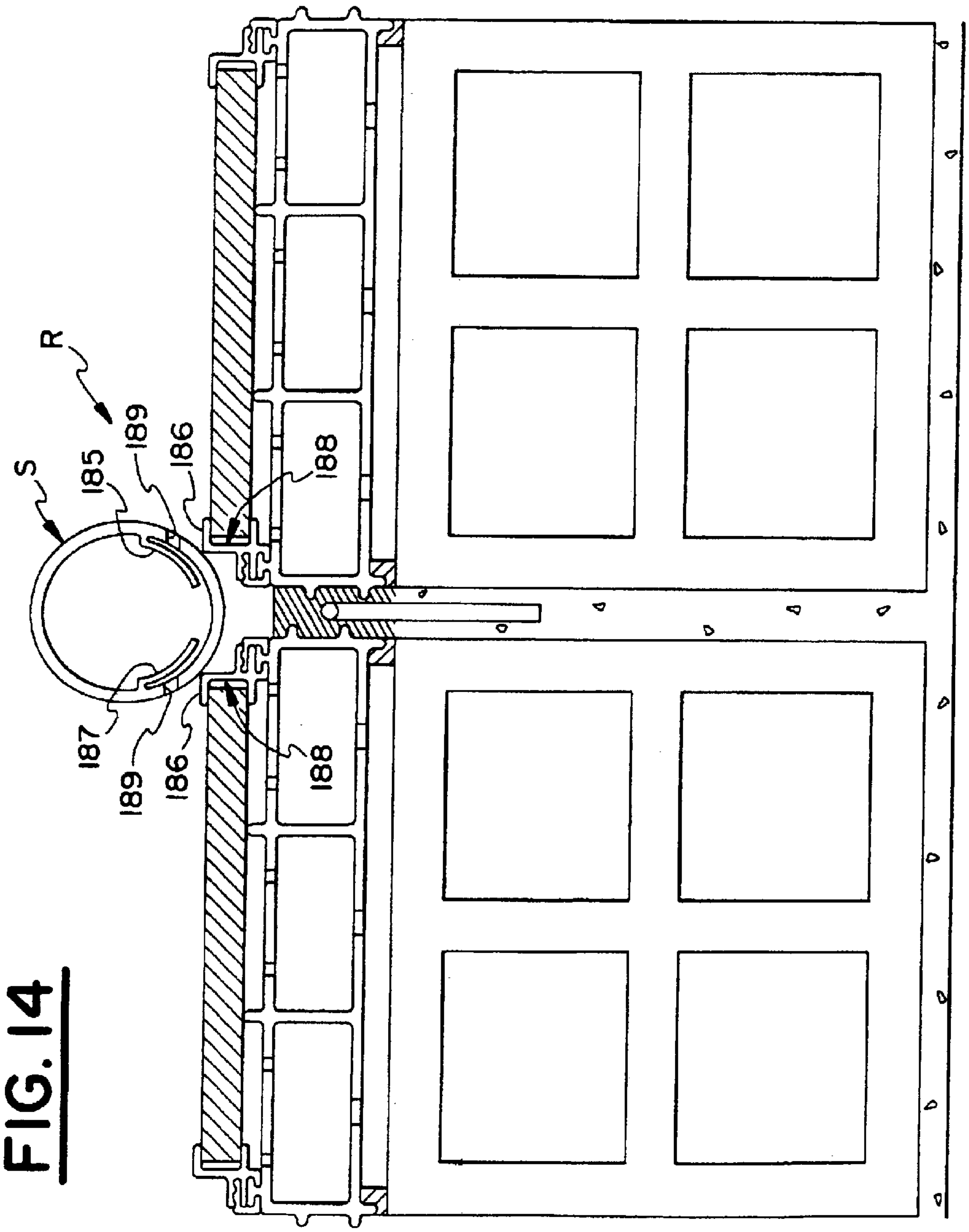
FIG. 14 is a cross-sectional view of a fourth preferred embodiment of the present invention.
Figure 15:
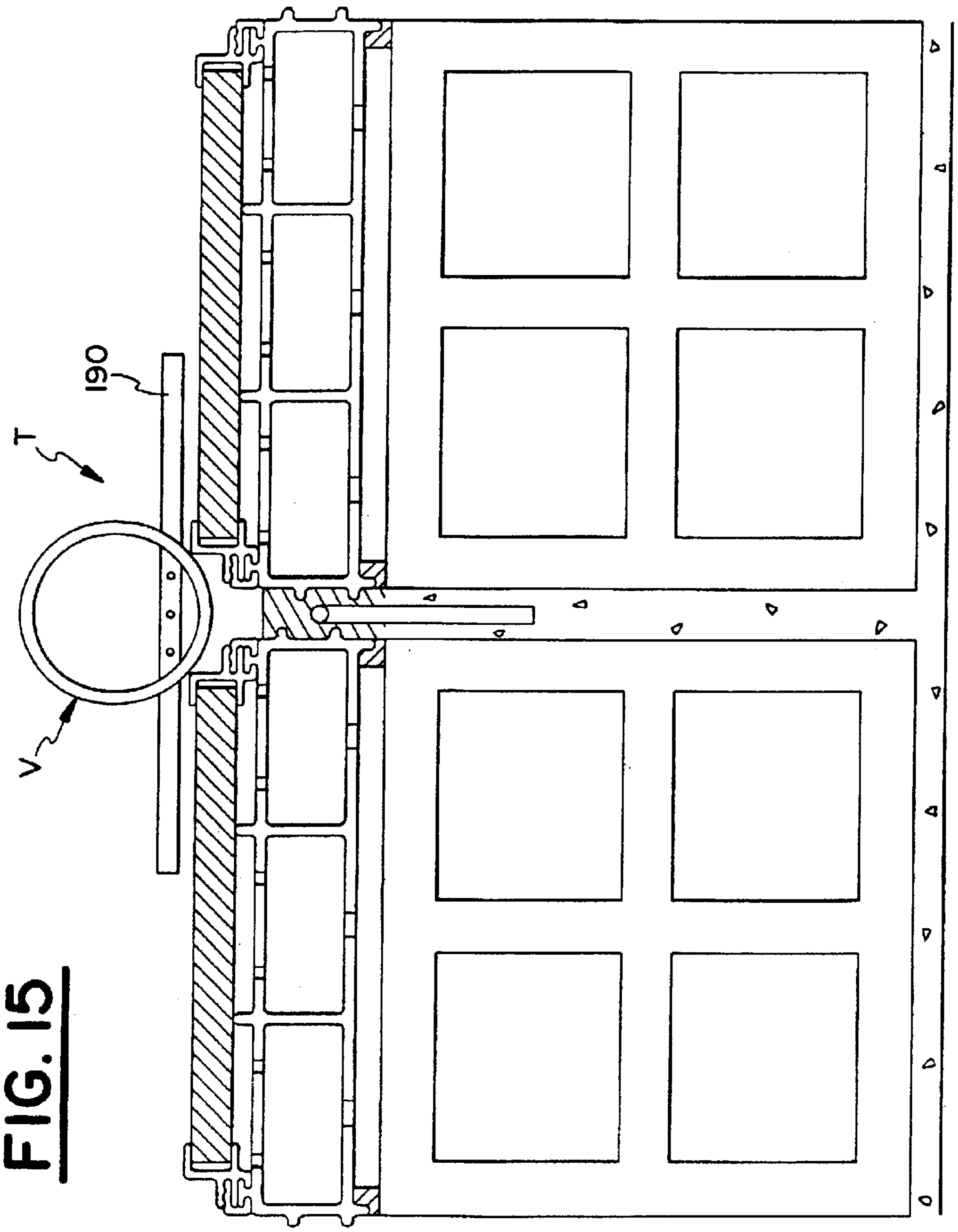
FIG. 15 is a cross-sectional view of a fifth preferred embodiment of the present invention.

FIGS. 14 and 15

Referring to FIG. 14, a fluid distribution system R similar to fluid distribution system K is depicted. Accordingly, only the differences will be described in detail. Specifically, the fluid distribution system R includes an air distribution conduit S. The air distribution S conduit is secured to or alternatively formed as one piece with elements 186 of porous plate support members 188. Air conduit S includes two internal flanges 185 and 187 which facilitate discharge of water through the water evacuation openings 189. Similarly, FIG. 15 depicts a fluid distribution system T that utilizes another alternative air distribution conduit U. A plurality of laterals 190 extend outwardly from the air distribution conduit U. The laterals 190 have a plurality of openings (not shown) to discharge air into the filter bed during air scouring. Air distribution conduit U is secured in a similar manner to air distribution conduit S.

Figure 16:
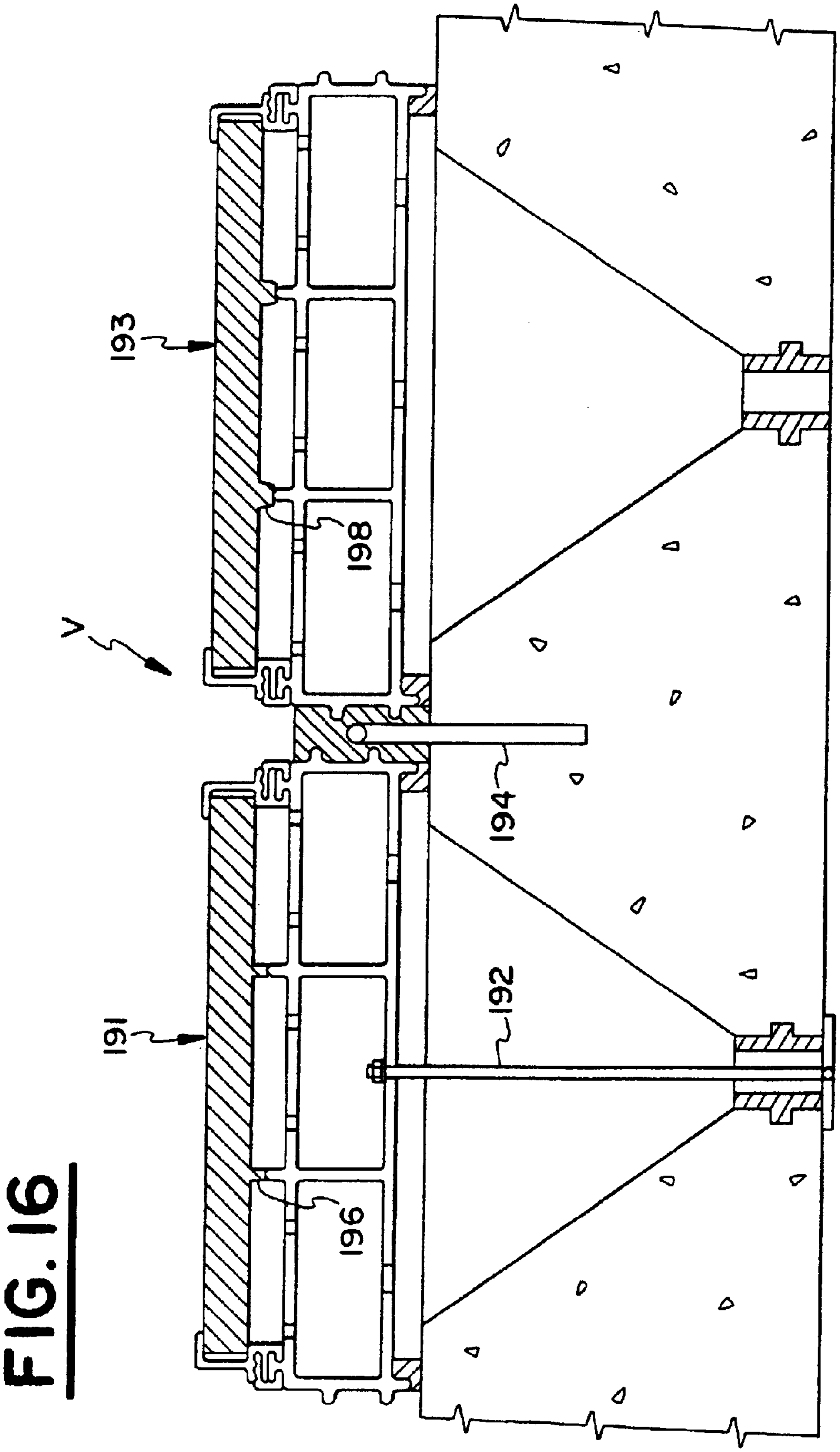
FIG. 16 is a cross-sectional view of a sixth preferred embodiment of the present invention.
Figure 17:
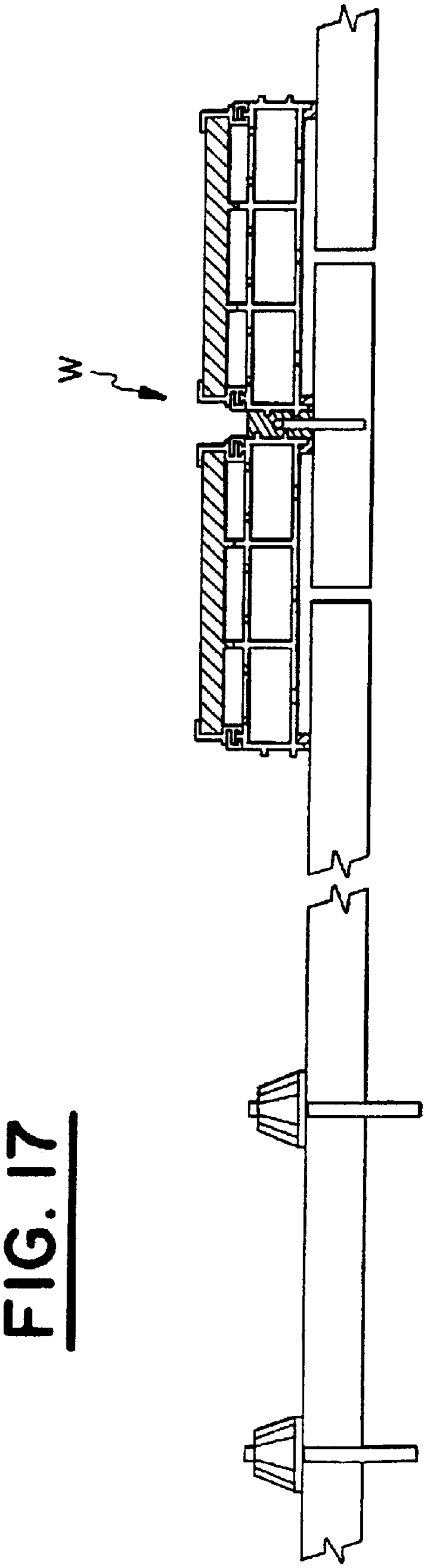
FIG. 17 is a cross-sectional view of a seventh preferred embodiment of the present invention.
Figure 18:
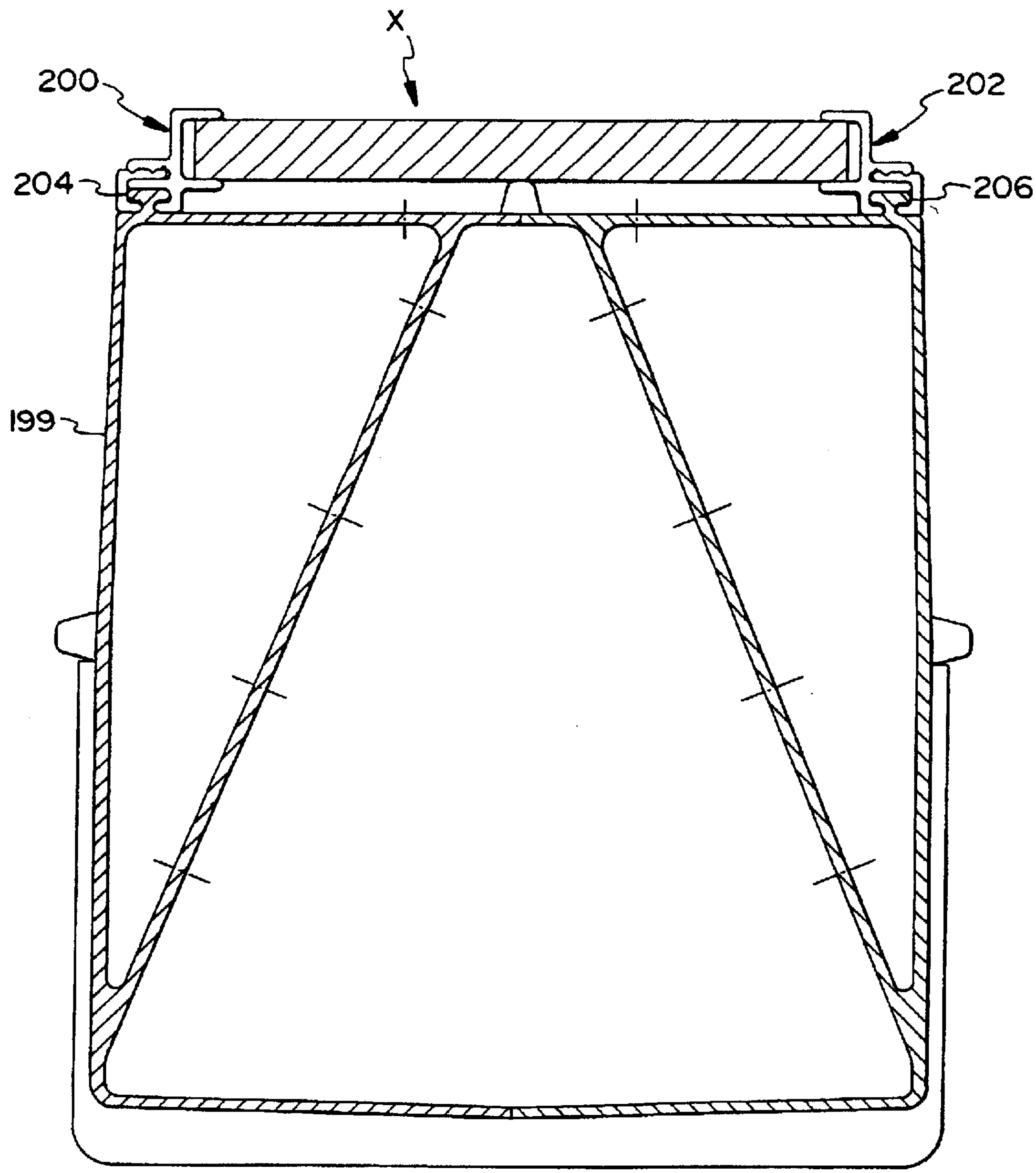
FIG. 18 is a cross-sectional view of an eighth preferred embodiment of the present invention.

FIGS. 16 Through 18

Referring to FIG. 16, fluid distribution system V is similar to the fluid distribution system K with the exceptions that the air conduit has been omitted and the existing underdrain is a monolithic wheeler bottom. In addition, a toggle bolt 192 may be used with or in place of the rebar hook anchor 194. Further, porous plates 191 and 193 may be provided with protrusions 196 or 198 to provide additional support for the mid-section of the plates. Referring to FIG. 17, a fluid distribution system W, similar to fluid distribution system V, is being installed over an existing nozzle underdrain. Referring to FIG. 18, a fluid distribution system X is mounted on a Trilateral air/water underdrain 199 via porous plate support members 200 and 202. Support members 200 and 202 are connected to end rails 204 and 206, respectively. Preferably, end rails 204 and 206 are formed as one piece with the Trilateral air/water underdrain 199. Support members 200 and 202 are similar to support member 116 depicted in FIG. 6, and, therefore will not be described in detail.

Figure 19:
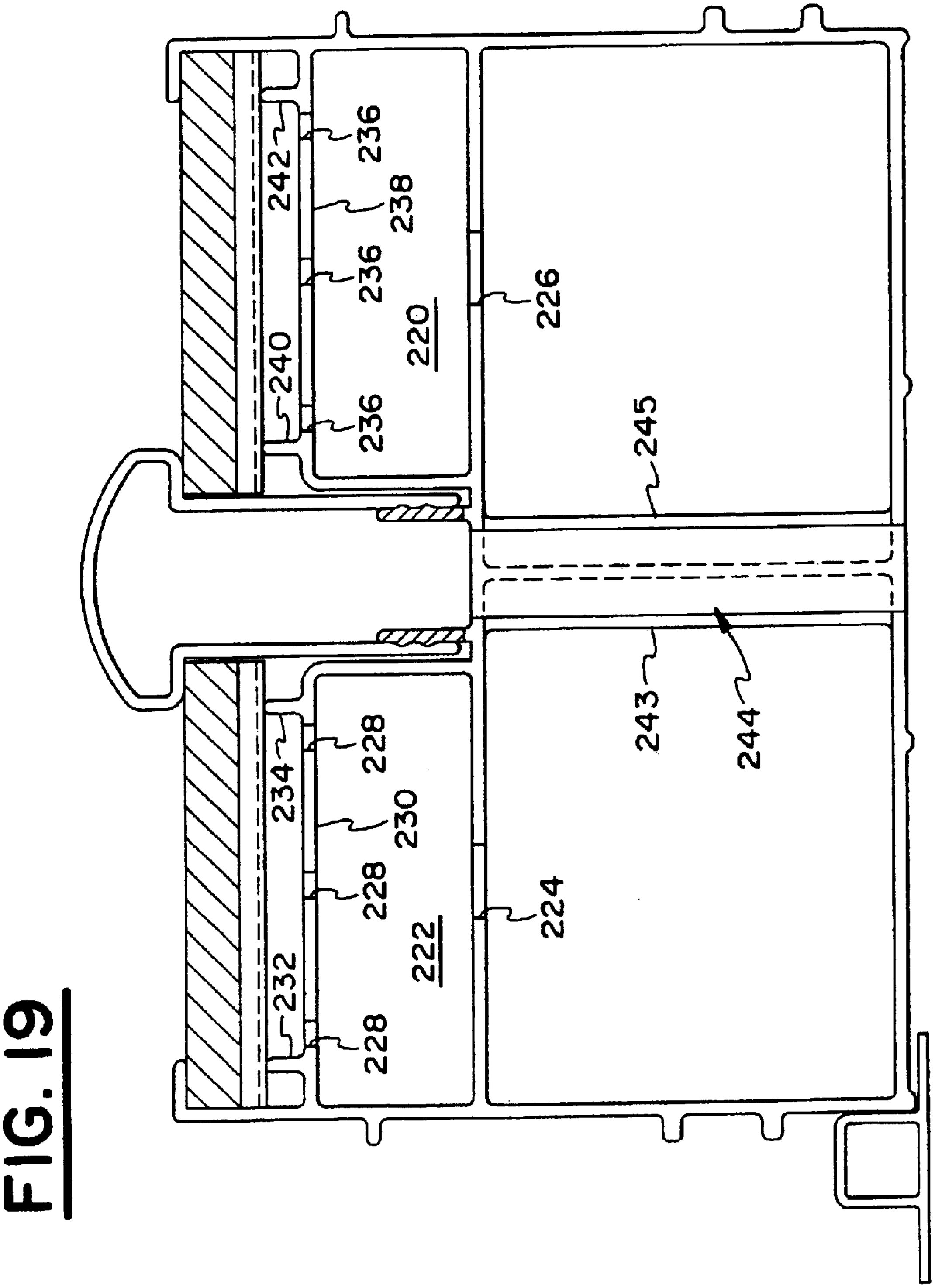
FIG. 19 is a cross-sectional view of a ninth preferred embodiment of the present invention.
Figure 20:
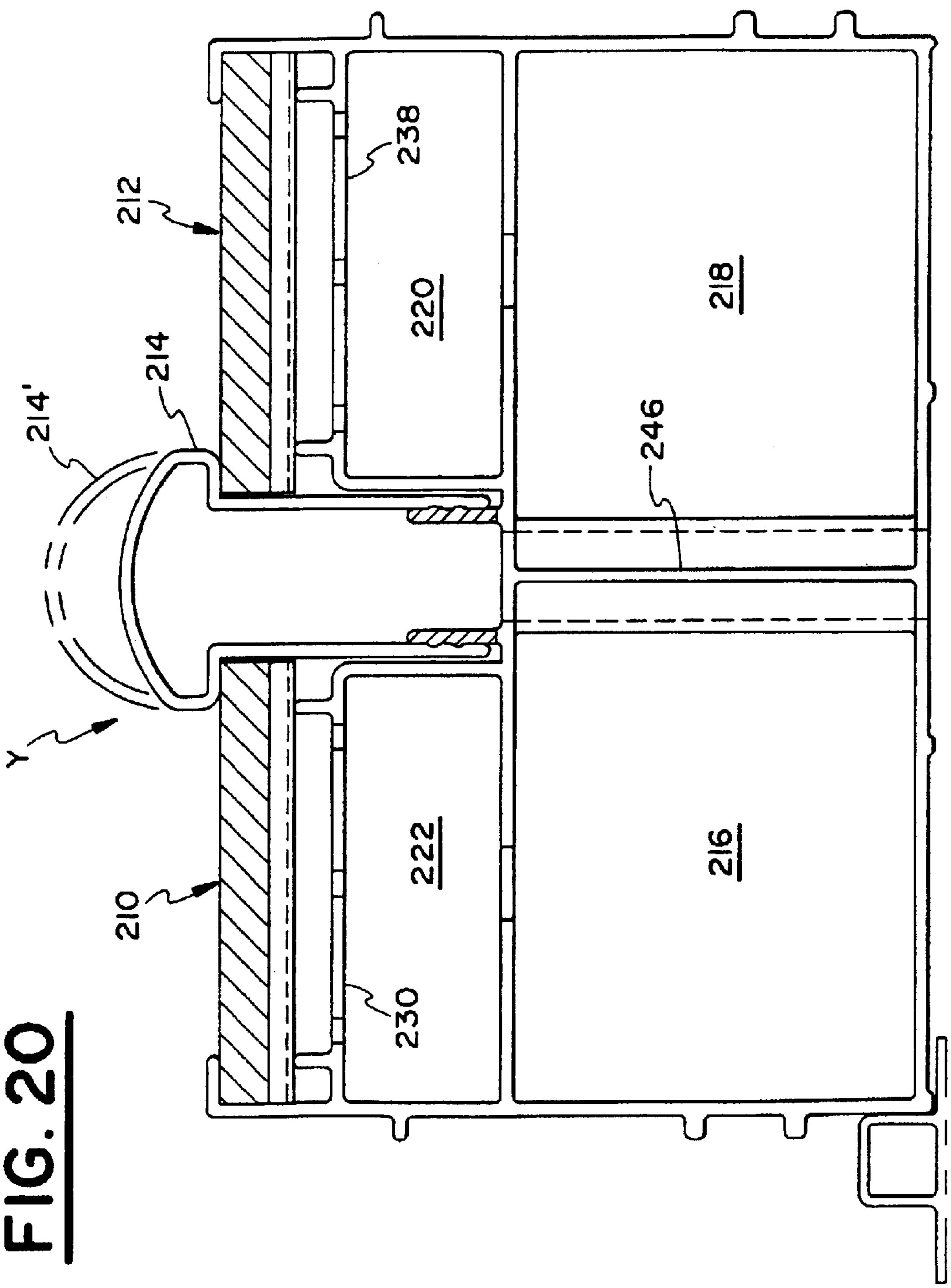
FIG. 20 is a cross-sectional view taken along a different section of the ninth preferred embodiment of the present invention.
Figure 21:
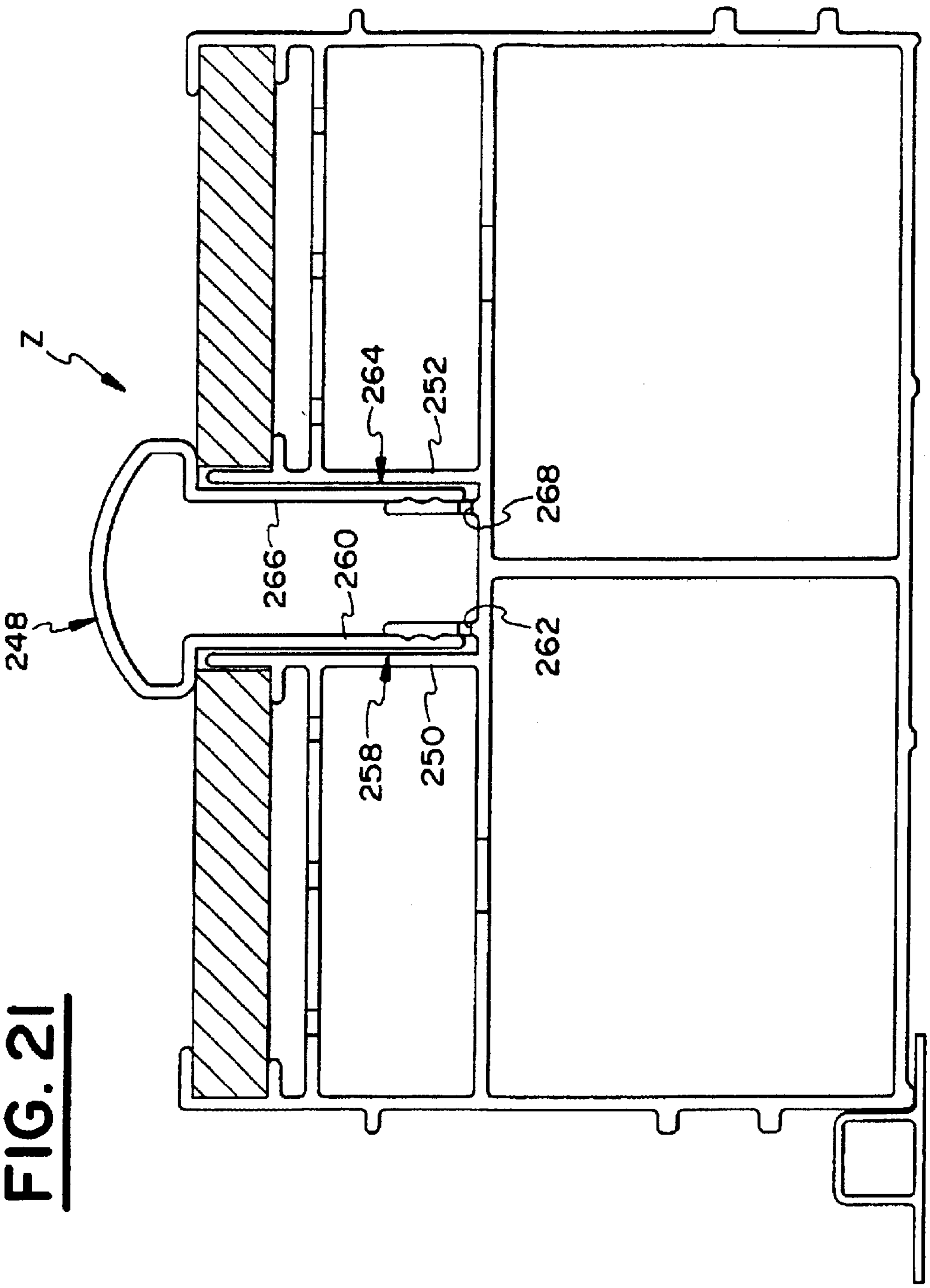
FIG. 21 is a cross-sectional view of a tenth preferred embodiment of the present invention.

FIGS. 19 Through 21

Referring to FIGS. 19 and 20, fluid distribution system Y includes a one-piece underdrain 208, porous plates 210 and 212 and air distribution conduit 214. Porous plates 210 and 212 are similar to porous plates 42 and 50. Underdrain 208 includes fluid chambers 216, 218, 220 and 222. Chamber 216 communicates with chamber 222 via a plurality of openings 224 (only one of which is shown). Similarly, chamber 218 communicates with chamber 220 via a plurality of openings 226 (only one of which is shown). Openings 228 are formed in upper wall 230 to permit fluids to pass upwardly through porous plate 210. Support walls 232 and 234 extend upwardly from upper wall 230 to provide additional support for porous plate 210. Openings 236 are formed in upper wall 238 to permit fluids to pass upwardly through porous plate 212. Support walls 240 and 242 extend upwardly from upper wall 238 to provide additional support for porous plate 212.

Underdrain 208 includes a plurality of air passageways 244 uniformly spaced along its longitudinal axis. The left and right sides of air passageways 244 are bounded by support walls 243 and 245, respectively. Support walls provide internal support for the underdrain 208. Air passageways 244 are connected to air distribution conduit 214. An air supply source is connected to the air passageways 244 to direct air to air conduit 214. Referring to FIG. 20, the underdrain includes vertical support walls 246. The vertical support walls 246 are positioned intermediate adjacent air passageways 244 and provide additional internal support.

Air conduit 214 is similar to air conduits E and F and, therefore, will not be described in detail. Dashed line 214' illustrates another possible variation of the air conduit. It should also be noted that the air conduit could be formed as one piece with the underdrain or underdrain cap.

Referring to FIG. 21, fluid distribution system Z is similar to fluid distribution system Y and, therefore, only the significant differences will be described. Air is supplied to air conduit 248 in a manner similar to that depicted in FIG. 1. Accordingly, the fluid distribution system Z does not include internal air passageways that are utilized in fluid distribution system Y. The one-piece underdrain includes support members 250 and 252 for supporting corresponding ends of the porous plates 254 and 256.

An air channel 258 is formed between support member 250 and wall 260 of air conduit 248. Air channel 258 extends upwardly along the air conduit 248 and allows air discharged from the air conduit 248 via opening 262 to be released into the filter bed during the step of air scouring the bed to clean the same. Similarly, an air channel 264 is formed between support member 252 and wall 266 of air conduit 248. Air channel 264 extends upwardly along the air conduit 248 and allows air discharged from the air conduit 248 via opening 268 to be released into the filter bed during the step of air scouring the bed to clean the same.

While this invention has been described as having preferred designs, it is understood that it is capable of further modifications, uses and/or adaptions of the invention following in general the principle of the invention and including such departures from the present invention as come within the known customary practice in the art to which the invention pertains and as may be applied to the central features hereinbefore set forth, and fall within the scope of the invention and the limits of the appended claims.

We claim:

1. An apparatus for use in a filter system for filtering water or wastewater, said apparatus comprising:

(a) an underdrain, said underdrain having at least one chamber;

(b) a porous plate; and, (c) at least one support member for supporting said porous plate in fixed relationship relative to said at least one chamber, said support member having a weakness point for permitting said porous plate to be readily removed from said support member.

2. An apparatus as set forth in claim 1, further including:

(a) at least two support members for supporting said porous plate in fixed relationship relative to said at least one chamber, each of said support members having a weakness point for permitting said porous plate to be readily removed from said support members.

3. An apparatus as set forth in claim 1, wherein:

(a) said at least one support member includes first and second sections, said first section being a separate piece from said second section, said first section having a weakness point.

4. An apparatus as set forth in claim 1, wherein:

(a) said at least one support member includes first and second sections, said first section is a separate piece from said second section, said first section has a weakness point formed therein, said first section further includes a recess for receiving a porous plate.

5. An apparatus as set forth in claim 4, wherein:

(a) said first section includes first and second horizontally extending segments; said second section includes a first horizontally extending segment, said first horizontally extending segment of said second section is positioned between said first and second horizontally extending segments of said first section.

6. An apparatus as set forth in claim 5, wherein:

(a) one of said first and second horizontally extending segments of said first section includes first and second protrusions; and, (b) said first horizontally extending segment of said second section has first and second recesses for receiving said first and second protrusions, respectively.

7. An apparatus as set forth in claim 1, further including:

(a) an air distribution conduit mounted above said at least one chamber of said underdrain.

8. An apparatus as set forth in claim 1, further including:

(a) an air distribution conduit detachably mounted above said at least one chamber of said underdrain.

9. An apparatus as set forth in claim 8, wherein:

(a) said air distribution conduit has at least one internal flange for facilitating the evacuation of liquid from said air distribution conduit.

10. An apparatus as set forth in claim 8, wherein:

(a) said air distribution conduit has at least two internal flanges for facilitating the evacuation of liquid from said air distribution conduit.

11. An apparatus as set forth in claim 1, wherein:

(a) said at least one support member includes first and second sections, said first section is a separate piece from said second section, said first section has a weakness point formed therein, said first section includes a recess for receiving a porous plate.

12. An apparatus as set forth in claim 11, wherein:

(a) said first section includes first and second horizontally extending segments; said second sectionincludes a first horizontally extending segment, said first horizontally extending segment of said second section is positioned between said first and second horizontally extending segments of said first section.

13. An apparatus as set forth in claim 12, wherein:

(a) one of said first and second horizontally extending segments of said first section includes first and second protrusions; and, (b) said first horizontally extending segment of said second section has first and second recesses for receiving said first and second protrusions, respectively.

14. An apparatus for use in a filter system for filtering water or wastewater, said apparatus comprising:

(a) an underdrain, said underdrain having at least one chamber;

(b) a porous plate;

(c) at least one support arm for supporting said porous plate in fixed relationship relative to said at least one chamber, said support arm having means for permitting said porous plate to be readily removed from said support arm;

(d) said underdrain includes an underdrain block and an underdrain cap, said underdrain cap being mounted on said underdrain block;

(e) said at least one support arm is operably connected to said underdrain cap.

15. An apparatus as set forth in claim 14, wherein:

(a) said underdrain cap includes at least one rail, said at least one support arm is connected to said at least one rail of said underdrain cap.

* * * * *

UNITED STATES PATENT AND TRADEMARK OFFICE

CERTIFICATE OF CORRECTION

PATENT NO. : 6,989,096 B2
DATED : January 24, 2006
INVENTOR(S) : R. Lee Roberts and Mark Kevin Addison It is certified that error appears in the above-identified patent and that said Letters Patent is hereby corrected as shown below:

Column 12,
Line 17, “sectionincludes” should be -- section includes --.

Signed and Sealed this

Twenty-eighth Day of March, 2006

JON W. DUDAS
*Director of the United States Patent and Trademark Office*